United States Patent
Andrews et al.

(10) Patent No.: US 6,317,098 B1
(45) Date of Patent: Nov. 13, 2001

(54) COMMUNICATION EMPLOYING TRIPLY-POLARIZED TRANSMISSIONS

(75) Inventors: Michael R Andrews, Murray Hill; Partha Pratim Mitra, Summit; David James Thomson, Murray Hill, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/477,972

(22) Filed: Jan. 5, 2000

Related U.S. Application Data

(63) Continuation-in-part of application No. 09/379,151, filed on Aug. 23, 1999, now Pat. No. 6,195,064.

(51) Int. Cl.[7] .................................................. H01Q 21/26
(52) U.S. Cl. ........................................... 343/797; 342/361
(58) Field of Search ..................... 343/797, 793, 343/808, 893, 700 R; 342/361, 158; 455/39, 91, 130

(56) References Cited

U.S. PATENT DOCUMENTS

| | | | |
|---|---|---|---|
| 2,320,124 | * 5/1943 | Fobes ....................... | 250/20 |
| 5,124,711 | * 6/1992 | Sorais et al. ............ | 342/361 |
| 5,262,788 | * 11/1993 | Drabowitch et al. ...... | 342/361 |
| 5,300,885 | 4/1994 | Bull ........................ | 324/247 |
| 5,592,490 | * 1/1997 | Barratt et al. ........... | 370/310 |
| 5,621,752 | * 4/1997 | Antonio et al. .......... | 375/200 |
| 5,634,199 | * 5/1997 | Gerlach et al. .......... | 455/63 |
| 5,724,666 | * 3/1998 | Dent ....................... | 455/562 |
| 5,771,439 | * 6/1998 | Kennedy, Jr. et al. ...... | 455/63 |
| 5,828,658 | * 10/1998 | Ottersten et al. ......... | 370/310 |
| 5,892,879 | * 4/1999 | Oshima .................... | 348/726 |
| 5,933,788 | * 8/1999 | Faeber et al. ............ | 342/361 |
| 6,052,333 | * 4/2000 | Williams .................. | 367/49 |
| 6,097,771 | * 8/2000 | Foschini ................... | 375/346 |
| 6,115,427 | * 9/2000 | Calderbank et al. ....... | 375/267 |

OTHER PUBLICATIONS

U.S. Patent Application Serial No. 08/673981, filed Jul. 1, 1996 (Foschini 6).
U.S. Patent Application Serial No. 09/060,657, filed Apr. 15, 1998 (Foschini 7–18).
U.S. Patent Application Provisional Serial No. 60/141,504, filed Jun. 28, 1999 (Foschini 9–14–5).
U.S. Patent Application Serial No. 09/438,900, filed Nov. 12, 1999 (Hassibi 1).
Morgan, M. et al., "Synthesis and analysis of elliptic polarization loci in terms of space–quadranture sinusoidal components", *Proc. IRE 39,* 552–556 (1951).
Hatke, G.F. "Conditions for unambiguous source location using polarization diverse arrays", IEEE Twenty–seventh Asilomar Conference on signals, Systems & Computers, 1365–1369 (1993).
Afraimovich, E.L. et al., Determining polarization parameters and angles of arrival of hf radio signals using three mutually orthogonal antennas. *Radio Science* 34, 1217–1225 (1999).

\* cited by examiner

*Primary Examiner*—Don Wong
*Assistant Examiner*—Thuy Vinh Tran
(74) *Attorney, Agent, or Firm*—Martin I. Finston

(57) ABSTRACT

Problems of fading in a multi-path environment are ameliorated, and the presence of reflective surfaces is turned from a disadvantage to an advantage, by employing a third polarization direction that effectively creates a third communication channel. This third communication channel can be used to send more information, or to send information with enhanced spatial diversity to thereby improve the overall communication performance. A transmitted signal with three polarization directions is created with a transmitter having, illustratively, three dipole antennas that are spatially orthogonal to each other. A received signal having energy content in three polarization directions is detected by a receiver having, illustratively, three dipole antennas that are spatially orthogonal to each other.

27 Claims, 5 Drawing Sheets

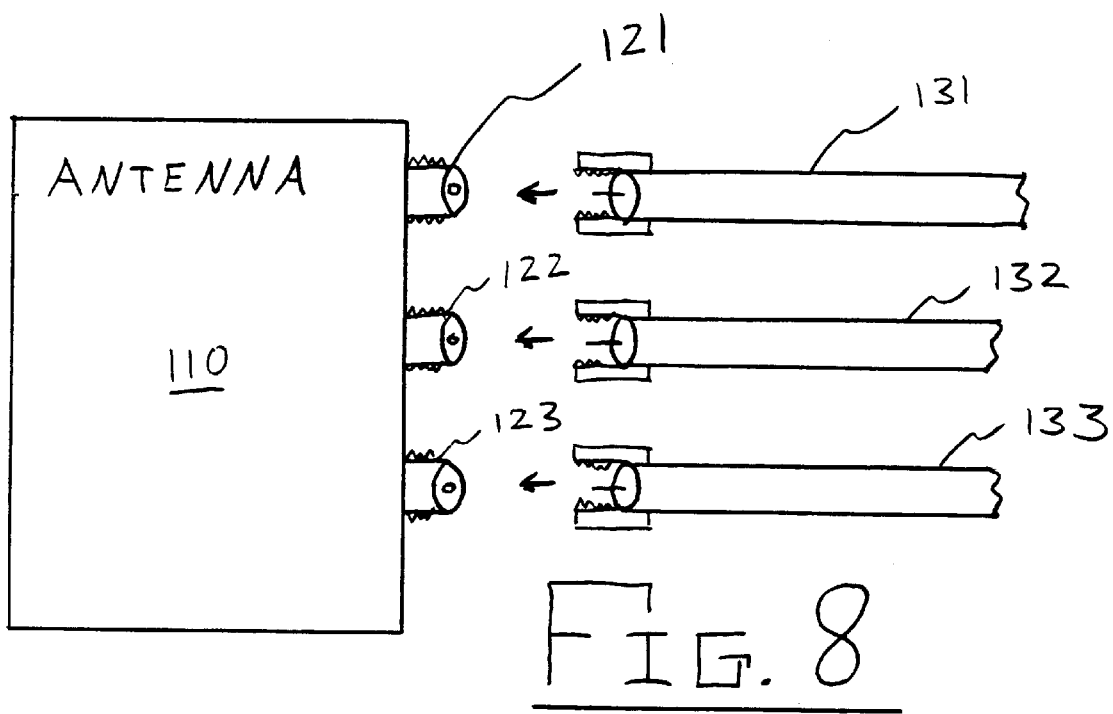

COMMUNICATION EMPLOYING TRIPLY-POLARIZED TRANSMISSIONS

CROSS-REFERENCE TO RELATED APPLICATION

This application is a continuation-in-part of application Ser. No. 09/379,151 filed on Aug. 23, 1999, now U.S. Pat. No. 6,195,064.

BACKGROUND OF THE INVENTION

This invention relates to wireless communication. More particularly, this invention relates to use of polarized communication signals.

Prior art systems accept the long-recognized constraint imposed by Maxwell's equations that signals which are transmitted from point A to point B over a free space path that directly connects points A and B, and which differ only in their polarization modes, can comprise at most two independent channels. The reason for this constraint lies in the fact that the polarized transmission coefficients between points A and B form a matrix, T, of rank 2. The prior art, therefore, were always of the view that signals can be usefully transmitted from a point A to point B at most with two polarizations, and realizing thereby at most two independent channels of communication. This is demonstrated in the prior art system of FIG. 1, where a transmitter 10 has one dipole antenna 11 and another dipole antenna 12 and a receiver 20 has one dipole antenna 21 and another dipole antenna 22. Typically, dipole antennas 11 and 12 are oriented perpendicular to each other, and so are dipole antennas 21 and 22. The most efficient transfer of information from the transmitter to the receiver occurs when antennas 11 and 12 are in a plane that is perpendicular to the line connecting points A and B, antennas 21 and 22 are in a plane that is parallel to the plane of antennas 11 and 12, and antenna dipole 11 is also in a plane that contains antenna 21. Of course, any other spatial arrangement of antennas 11, 12, 21 and 22 may be used for communicating information from the transmitter to the receiver, except that the effectiveness of the communication is reduced (a greater portion of the transmitted signal energy cannot be recovered), and the processing burden on the receiver is increased (both antennas 21 and 22 detect a portion of the signal of antenna 11 and of antenna 12).

Whether a transmitter has a single antenna (polarized or not) or two polarized antennas (as in FIG. 1), it remains that multi-pathing presents a problem. Specifically, multiple paths can cause destructive interference in the received signal, and in indoor environments that presents a major problem because there are many reflective surfaces that cause multiple paths, and those reflective surfaces are nearby (which results in the multiple path signals having significant amplitudes).

SUMMARY OF THE INVENTION

The problems of fading in a multi-path environment are ameliorated, and the presence of reflective surfaces is turned from a disadvantage to an advantage, by employing a receiver that accepts and utilizes signals that are polarized to contain energy in the three orthogonal directions of free space. Even more improved operation is obtained when the transmitter transmits information in three independent communication channels with signals that are polarized so that there is transmitted signal energy in the three orthogonal directions of free space. in a third independent communications channel, The third communication channel, not utilized in communication systems of the prior art can be used to send more information, or to send information with enhanced polarization diversity to thereby improve the overall communication efficiency. A transmitted signal with the third polarization direction is created, illustratively, with a transmitter having a third antenna dipole that is orthogonal to the transmitter's first and second antenna dipoles. To take advantage of the signal with the third polarization direction, the receiver illustratively also comprises three mutually orthogonal antenna dipoles.

BRIEF DESCRIPTION OF THE DRAWINGS

FIG. 8 presents a block diagram of a tripole antenna having three input or output connections in conformance with the principles disclosed herein.

DETAILED DESCRIPTION

Figure 1:
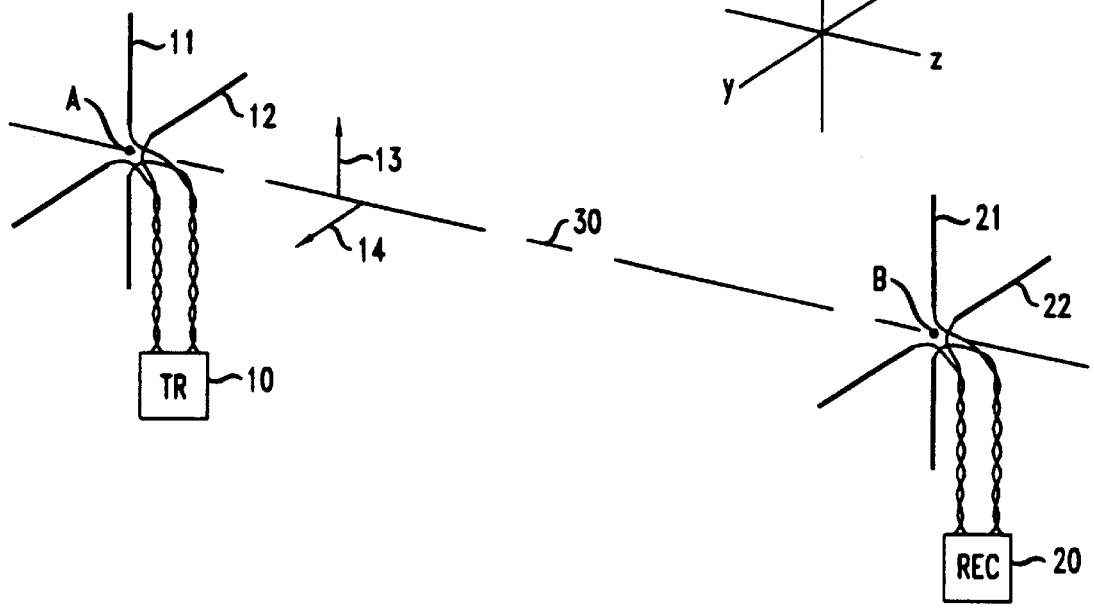
FIG. 1 presents a prior art arrangement.

The arrangement of FIG. 1 is shown to employ antenna dipoles that are orthogonal to each other. The arrangements disclosed in the figures that follow FIG. 1, and described herein, are also depicted with antenna dipoles that are orthogonal to each other. It should be understood, however, that these arrangements are so presented for convenience of the description herein. Use of antenna arrangements that are other than three antenna dipoles that are orthogonal to each other, and other than transmitting effectively from one point is within the scope of this invention. The key attribute of a receiving antenna arrangement is that it can receive signals that are effectively polarized in any and all of three mutually orthogonal directions. It is expected, however, that the transmitting and receiving antennas used will be constructed so as to be associated with a single physical hardware unit (such as a base station, mobile wireless terminal, etc.).

As indicated above in connection with the perspective view presented in FIG. 1, the positioning of antennas 11 and 12 relative to antennas 21 and 22 is critical only when the maximum energy is to be transferred from transmitter 10 to receiver 20. In such situations, the plane in which antennas 11 and 12 lie should be parallel to the plane in which antennas 21 and 22 lie, and those planes should be perpendicular to line 30 that connects points A and B. Arrow 13 shows the polarized signal in plane x-z, and arrow 14 shows the polarized signal of plane y-z. Illustratively, arrows 13 and 14 depict the same signal strength.

Figure 2:
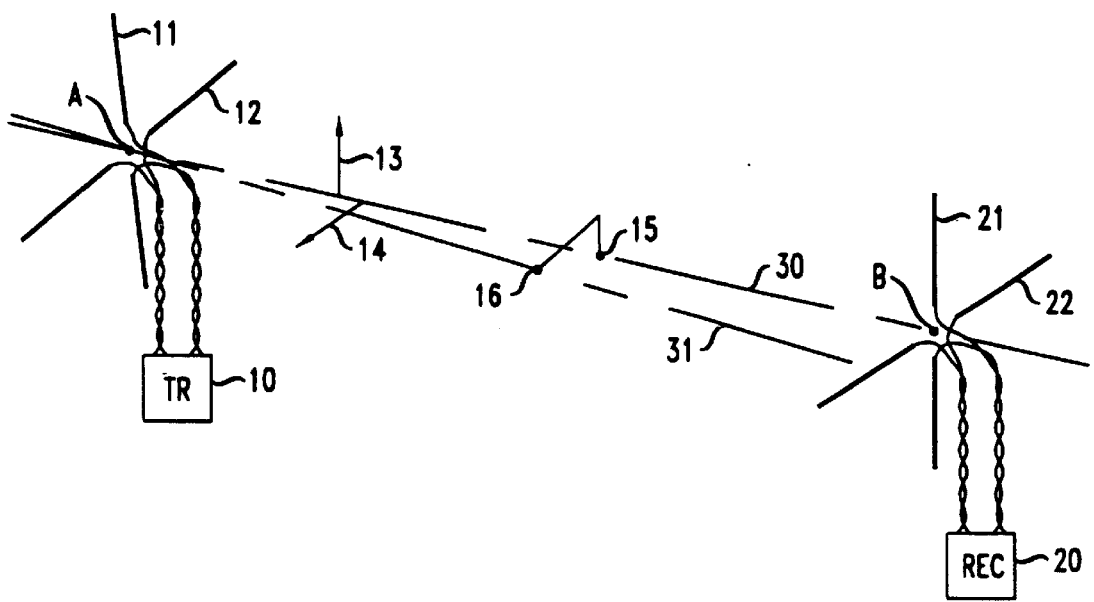
FIG. 2 illustrates a condition in which the transmitter antennas are not optimally aligned.

Of course, regardless of the orientation of antennas 11 and 12 (relative to antennas 21 and 22), all transmitted signals can be expressed in terms of signals that are polarized along the x axis, the y axis, and the z axis of FIG. 1. An arrangement where the receiver's antennas are at some arbitrary orientation with respect to the transmitter's antennas is shown in FIG. 2, where the antenna 11–12 arrangement is rotated so that the plane in which antennas 11 and 12 lie is perpendicular to line 31. Because the drawing is in two dimensions and it may be difficult to perceive the direction of line 31, assume that point 15 is at a distance R from antennas 11 and 12 along line 30 and the rotation of line 30 about point A to make it coincide with line 31 moves point 15 to point 16. One has to move along the x, y and z axes to go from point 15 to point 16. This demonstrates visually that a signal that is polarized orthogonally to line 31 can be viewed to have signal components along the x, y and z axes, but those signals do not represent three independent signals.

Expressed mathematically, we can say $$\begin{bmatrix} r_1 \\ r_2 \\ r_3 \end{bmatrix} = \begin{bmatrix} h_{11} & h_{12} \\ h_{21} & h_{22} \\ h_{31} & h_{32} \end{bmatrix} \cdot \begin{bmatrix} s_1 \\ s_2 \end{bmatrix} + \vec{v} \quad (1)$$

or r=Hs, where the $s_1$ and $s_2$ are the signals sent by antennas 11 and 12, the matrix H contains, as elements thereof, the propagation channel's transmission coefficients between points A and B with respect to signals polarized in each of three orthogonal directions, and $r_1$, $r_2$, and $r_3$ are the signals present at the receiver's point B in the three orthogonal directions. The rank of a matrix is the largest square array in that matrix whose determinant does not vanish. Hence, the rank of matrix H is 2. The symbol $\vec{v}$ represents an additive noise vector, which is suppressed in the following discussion.

Of course, the arrangement of FIG. 2 has only two receiver antennas and, therefore, equation (1) degenerates to $$\begin{bmatrix} r_1 \\ r_2 \end{bmatrix} = \begin{bmatrix} h_{11} & h_{12} \\ h_{21} & h_{22} \end{bmatrix} \cdot \begin{bmatrix} s_1 \\ s_2 \end{bmatrix} \quad (2)$$

It can happen that the receiver and the transmitter antennas are aligned in such a way that one of the rows in H contains all zero coefficients, and if the row that contains the all zero coefficients is the first or the second row, then one of the receiver antennas will receive nothing. It can even happen that one of the coefficients in the non-zero row will also be zero, resulting in the situation that one receiving antenna is receiving only one of the sent signals. This is not really any worse than receiving a signal such as $r_1 = h_{11}s_1 + h_{12}s_2$ with no means, extrinsic to the signals themselves, to separate $s_1$ from $s_2$.

Figure 3:
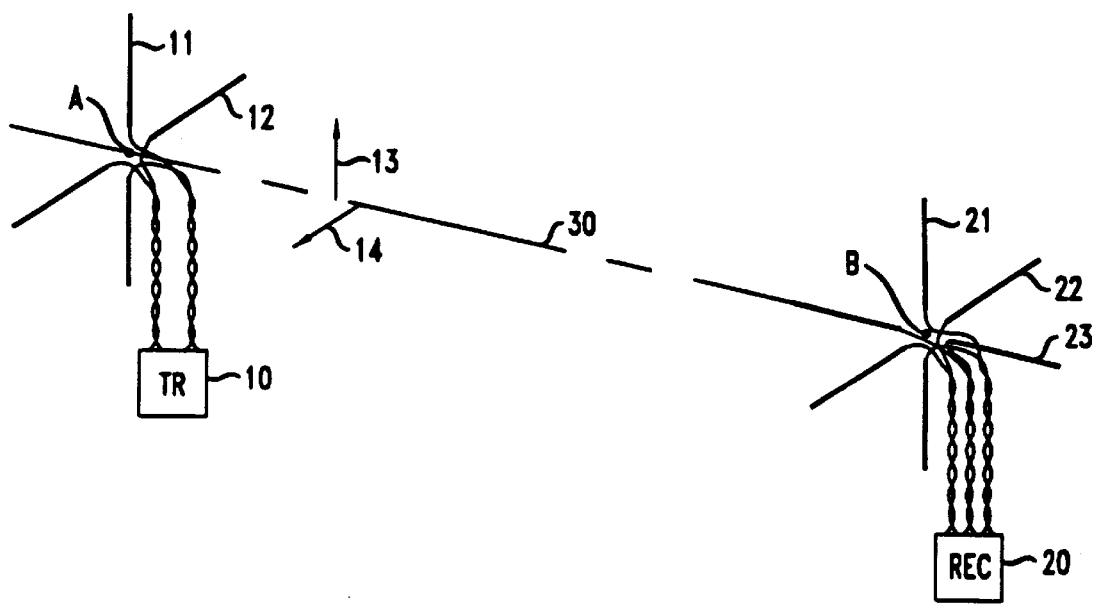
FIG. 3 presents an arrangement where the receiver has three dipole antennas.

Consider, however, the arrangement of FIG. 3, where the antennas of transmitter 10 are arranged as in FIG. 2 while receiver 20 includes a third antenna dipole 23 that is orthogonal to antenna dipoles 21 and 22. The relationship between the transmitted signal and the received signal is then as in equation (1), but now there are three detected signals. Therefore, even if one of the rows in equation (1) degenerates to zero, there are still two signals that are viable. Moreover, since the $s_1$ and $s_2$ signals are transmitted at different polarization directions, the coefficients of a column in T cannot be all zero. Hence, it is always possible to detect the transmitted signals $s_1$ and $s_2$. From the above it can be seen that use of the third receiver antenna obviates the need to align the transmitter and receiver antennas.

Figure 4:
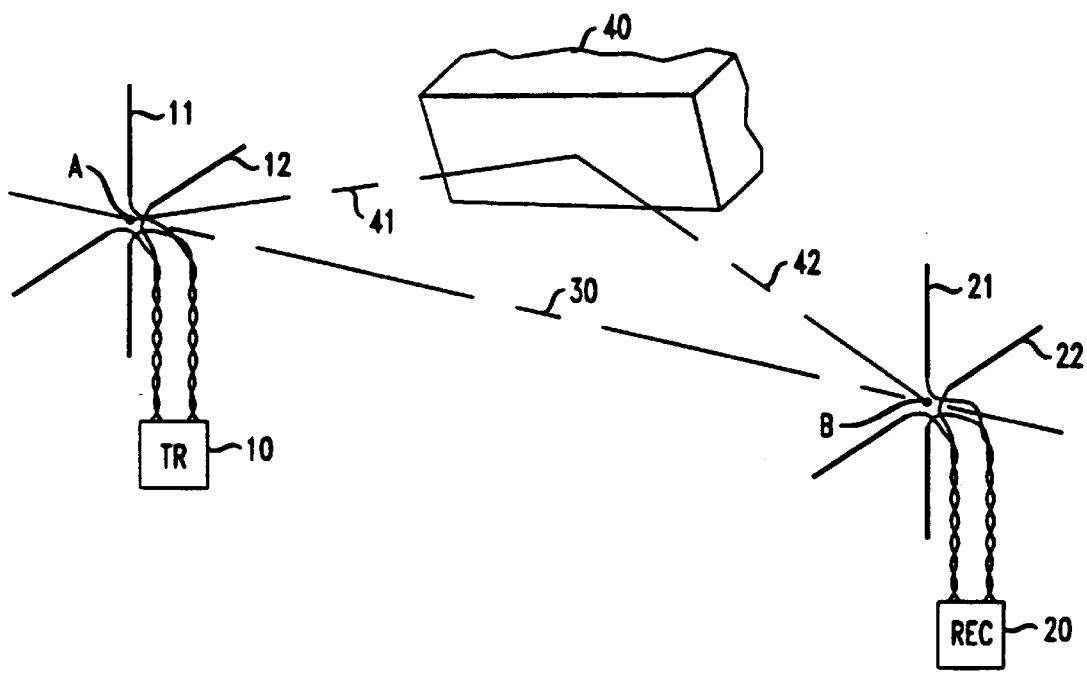
FIG. 4 illustrates a condition in which reflective surfaces contributing to the received signal.

Alternatively, consider the situation where the antennas of transmitter 10 are aligned for maximum reception by receiver 20 (as in FIG. 1), but there exists a second, reflective, path between the transmitter and the receiver. This is illustrated in FIG. 4 with a tilted surface 40, where the transmitter has the two antennas 11 and 12 and the receiver has the two antennas 21 and 22. It can be readily observed that there exists a path 41–42 that starts at transmitter 10, bounces off surface 40 and arrives at receiver 20. The direction of the signal that arrives via path 41–42 is not along path 30 (i.e. impinges on B at an angle other than 90 degrees relative to the plane containing antennas 21 and 22). The signals arriving at point B can be expressed by $$\begin{bmatrix} r_1 \\ r_2 \\ r_3 \end{bmatrix} = \begin{bmatrix} h_{11} & h_{12} \\ h_{21} & h_{22} \\ h_{31} & h_{32} \end{bmatrix} \cdot \begin{bmatrix} s_1 \\ s_2 \end{bmatrix} + \begin{bmatrix} h_{13} & h_{14} \\ h_{23} & h_{24} \\ h_{33} & h_{34} \end{bmatrix} \cdot \begin{bmatrix} s_1 \\ s_2 \end{bmatrix} \quad (3)$$

or $$\begin{bmatrix} r_1 \\ r_2 \\ r_3 \end{bmatrix} = \begin{bmatrix} h_{11}+h_{13} & h_{12}+h_{14} \\ h_{21}+h_{23} & h_{22}+h_{24} \\ h_{31}+h_{33} & h_{32}+h_{34} \end{bmatrix} \cdot \begin{bmatrix} s_1 \\ s_2 \end{bmatrix} = \begin{bmatrix} h'_{11} & h'_{12} \\ h'_{21} & h'_{22} \\ h'_{31} & h'_{32} \end{bmatrix} \cdot \begin{bmatrix} s_1 \\ s_2 \end{bmatrix} \quad (4)$$

or r=H's  (5)

Moreover, in an arrangement that has only two receiver antennas at point B, equation (4) degenerates to $$\begin{bmatrix} r_1 \\ r_2 \end{bmatrix} = \begin{bmatrix} h'_{11} & h'_{12} \\ h'_{21} & h'_{22} \end{bmatrix} \cdot \begin{bmatrix} s_1 \\ s_2 \end{bmatrix}, \quad (6)$$

Figure 5:
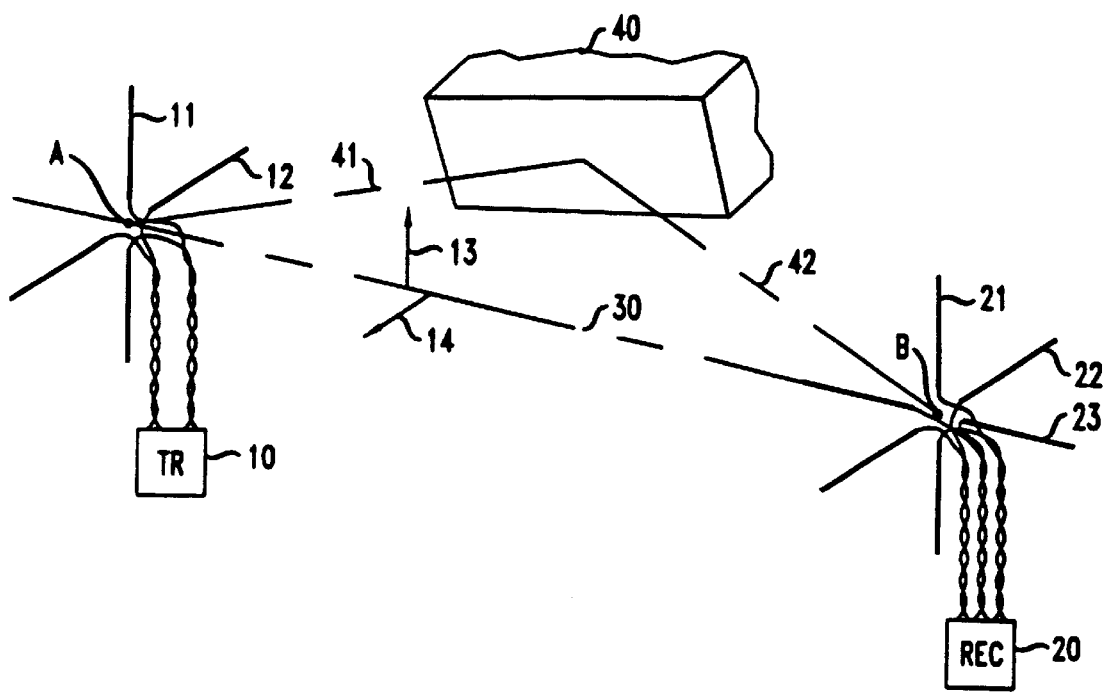
FIG. 5 presents an arrangement where the receiver has three dipole antennas and reflective surfaces contributing to the received signal.

Here, the likelihood of any row having all zero terms is still quite small. Fading can be reduced even in the face of this small likelihood in the arrangement of FIG. 5, where the receiver has antennas 21, 22, and 23, adapted to receive the signals $r_1$, $r_2$, and $r_3$ of equation (5).

Figure 6:
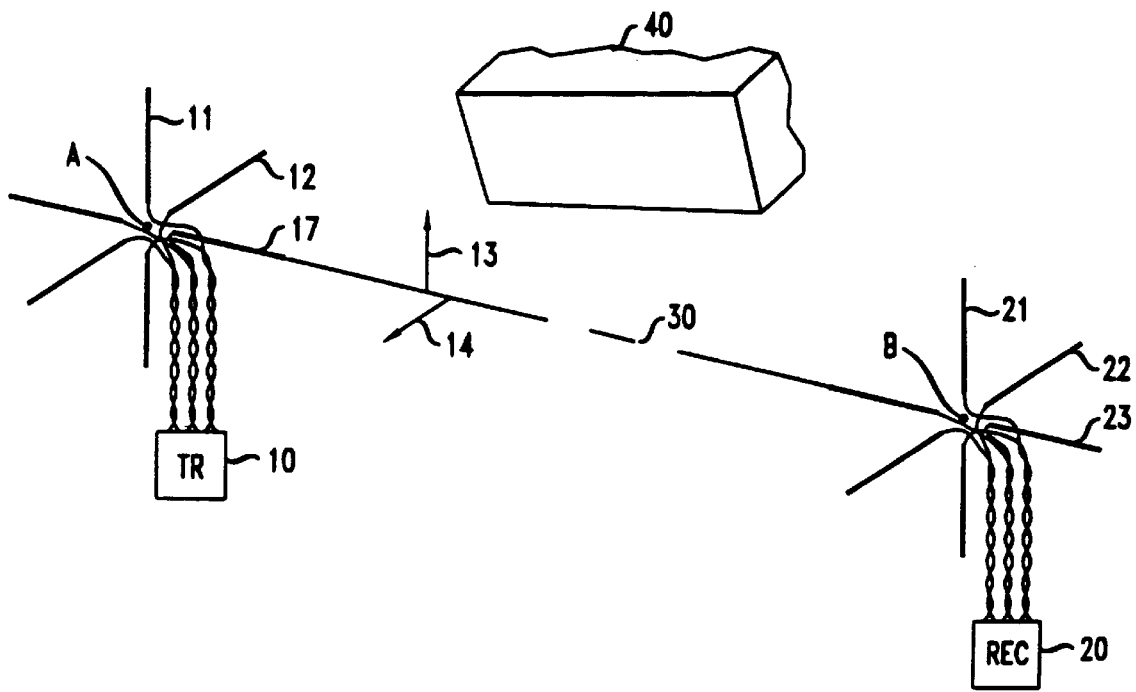
FIG. 6 presents an arrangement where both the transmitter and the receiver have three dipole antennas.

FIG. 6 depicts an arrangement where both transmitter 10 and receiver 20 employ three mutually orthogonal antennas, in an environment with multipathing. In this case, the transfer function is represented by r=H's where $$H' = \begin{bmatrix} h'_{11} & h'_{12} & h'_{13} \\ h'_{21} & h'_{22} & h'_{23} \\ h'_{31} & h'_{32} & h'_{33} \end{bmatrix}. \quad (7)$$

It can be shown that the matrix H' is of rank 3 and is, therefore, able to sustain three independent channels of information. Therefore, the transmitter 10 of FIG. 6 advantageously is able to transmit three independent signals, making the FIG. 6 arrangement well suited for high data rate transmissions in cellular environments in the presence of multi-paths, such as indoors. The third independent channel can be used to send additional information, it can be used to send the information with additional redundancy, or a combination of the two.

Figure 7:
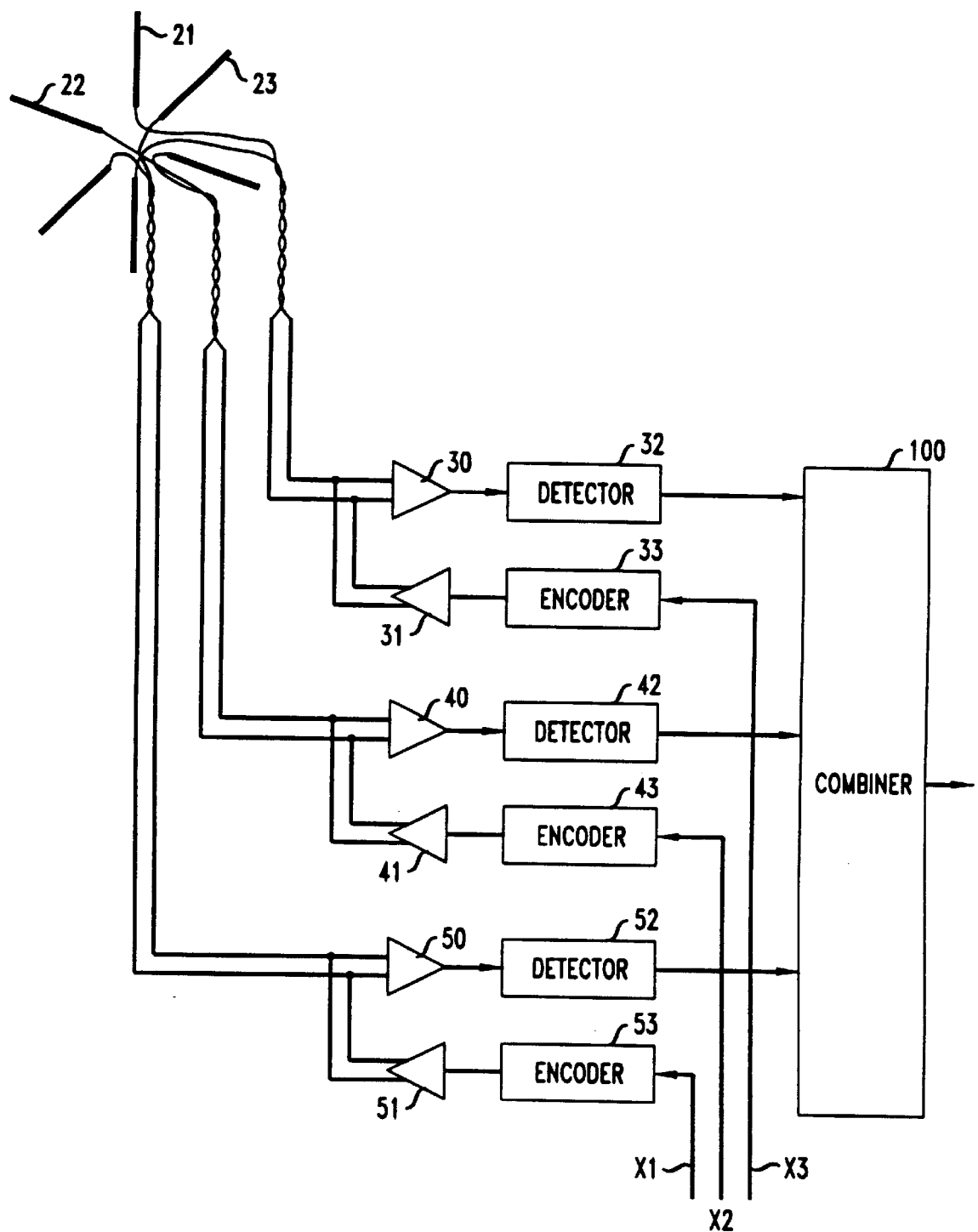
FIG. 7 presents a block diagram of a transceiver in conformance with the principles disclosed herein.

FIG. 7 presents in block diagram form the structure of a transceiver unit that employs three dipole antennas that are orthogonal to each other. Antennas 21, 22, and 23 each are connected to a port which receives signals from its antenna, and feeds signals to its antenna. Illustratively in FIG. 7, antenna 21 feeds signals to receiver 30, and transmitter 31 feeds signals to antenna 21. Receiver 30 applies its output signal to detector 32, which detects the signal $r_1$ and sends it to processor 100. Similarly, receiver 40 receives the signal of antenna 22, applies its output signal to detector 42, and detector 42 detects the signal $r_2$ and sends it to processor 100. Likewise, receiver 50 receives the signal of antenna 23, applies its output signal to detector 52, and detector 52 detects the signal $r_2$ and sends it to processor 100. By conventional means (e.g. involving the reception of known pilot signals, the elements of H' are known to processor 100, and processor 100 computes the signals $s_1$ $s_2$, and $s_3$ by evaluating $$s=(H')^{-1}r.$$

To transmit, signals X1, X2, and X2 are applied to encoders 33, 43, and 53, respectively, where they are encoded and applied to transmitters 51, 41, and 31, respectively. Transmitters 31, 41, and 51 feed their signals to antennas 21, 22, and 23.

The above discloses principles of this invention by means of illustrative embodiments. It should be understood that other embodiments can be employed, and that some of the characteristics of the illustrated embodiments do not necessarily form requirements of a viable design. By way of example, it should be realized that while it may be desirable to have the three dipole antennas spatially orthogonal to each other, an arrangement that does not quite have this orientation will still work. In the context of this disclosure, therefore, the term "orthogonal," where appropriate, includes "substantially orthogonal."

Broad definition of Tripole Antennas.

In the preceding discussion, we have described an illustrative transmitting or receiving antenna arrangement according to the present invention that comprises three dipole elements oriented in mutually orthogonal directions. In fact, antenna arrangements corresponding to the present invention, which we herein denominate "tripole antennas," can be characterized in even more general terms. A broad definition of a tripole antenna is conveniently stated with reference to FIG. 8. Shown in the figure is an antenna 110 having three signal connections 121–123. Antenna 110 may consist of a single element, or it may comprise plural antenna elements. Antenna 110 may be used for transmission or for reception of radio-frequency signals. Excitation of antenna 110 by an incident electromagnetic wave induces output currents at some or all of the signal connections 121–123.

Each output current has an amplitude, the magnitude of which is a real number. Each output current also has a relative phase shift. According to conventional practice, the combination of magnitude and relative phase shift is representable as a complex number, which we refer to as the complex current amplitude. The ordered outputs $i_1$, $i_2$, $i_3$ (expressed as the complex current amplitudes) from signal connections 121–123, respectively, are conveniently assembled into an output vector $$i = \begin{pmatrix} i_1 \\ i_2 \\ i_3 \end{pmatrix}.$$

According to our broad definition, antenna 110 is a tripole antenna if there can be found three incident plane waves, having mutually orthogonal polarizations, whose respective induced output vectors $i^{(1)}$, $i^{(2)}$, $i^{(3)}$ collectively span a complex three-dimensional vector space. It should be noted that the "mutually orthogonal polarizations" may include not only linear polarizations, but also circular and elliptical polarizations.

The above definition can be staed more precisely in terms of the matrix $$J = [i^{(1)} i^{(2)} i^{(3)}] = \begin{bmatrix} i_1^{(1)} & i_1^{(2)} & i_1^{(3)} \\ i_2^{(1)} & i_2^{(2)} & i_2^{(3)} \\ i_3^{(1)} & i_3^{(2)} & i_3^{(3)} \end{bmatrix}.$$

In those terms, the induced output vectors collectively span a complex three-dimensional vector space if J is a full-rank matrix. In the context of the present invention, we would consider J to be full-rank if the ratio of the largest to the smallest of its singular values were no more than fifty. Thus, in mathematical terms, antenna 110 is a tripole antenna if there can be found three incident plane waves, having mutually orthogonal polarizations, that induce output currents such that the matrix J has a greatest singular value no more than fifty times its smallest singular value.

In particular embodiments, including the exemplary embodiment comprising three mutually orthogonal dipole elements, the greatest singular value will be no more than ten times the smallest singular value, for an appropriate choice of incident polarized plane waves as explained above.

As noted, the broad definition of a tripole antenna, stated above, is applicable to both receiving and transmitting antennas. An alternative definition, particularly useful in the context of transmitting antennas, is stated in terms of the far-field radiation pattern of the antenna. Antenna 110 is a tripole antenna according to such definition if for each point in the far-field radiation pattern of the antenna, any arbitrary transverse polarization of the radiated electric field can be produced by an appropriate combination of inputs (corresponding to respective complex baseband signals) at connections 121–123. In use, the average powers applied to the three connections would typically be comparable. For example, the average power applied to any one connection would typically be at least 1% of the total average power applied to all three connections.

The preceding definition will apply to directive antennas if it is understood that "each point in the far-field radiation pattern" refers to points where there is substantial field amplitude, exemplarily at least 5% of the peak amplitude at a given distance from the antenna.

Various antenna arrangments will satisfy at least one of our broad definitions of a tripole antenna. One such arrangement, as already noted, comprises three mutually orthogonal dipole elements. A pair of dipole elements should be considered substantially orthogonal if they are within 15° of orthogonality. In fact, it is not necessary for the dipole elements to be orthogonal for the arrangement to qualify as a tripole antenna. For example, an arrangement of three dipole elements will function as a tripole antenna if there is an angle as small as 15°, or even less, between each pair of elements and between each element and the plane defined by the other two elements. Consequently, it will be advantageous in some cases to employ a tripole antenna comprising dipole elements arranged at mutual angles less than 90°, such as mutual angles of 45°, 30°, or 15°.

Directivity in Tripole Antennas

Some tripole antenna designs, such as those consisting of three orthogonal dipole elements, have radiation or sensitivity patterns that extend substantially in all directions. Other tripole antenna designs, however, will have substantial directivity. Directivity will be useful, for example, for avoiding interference in designated directions. Directivity can be achieved, for example, by arranging multiple tripole antennas in phased arrays according to known techniques. Directivity can also be achieved, according to known techniques, by situating an electrically conductive shielding or reflecting element adjacent the element or elements of the tripole antenna. For example, we believe that by using a metal shield, a tripole antenna is readily made that substantially radiates into, or receives from, a right-circular conical sector having a full vertex angle of 100°.

Polarization Diversity in Compact Antenna Arrangements.

It is well-known in the art that the undesirable effects of fading can be reduced by using arrays of spatially separated antenna elements for transmission or reception, in place of single antennas. By spatially separating the antenna elements, it is possible to provide two or more independent propagation paths. Because the paths are independent, there is an enhanced likelihood of acceptable reception even in the presence of poor propagation conditions (which are unlikely to affect all paths equally). Moreover, known methods of detection can be used to enhance signal quality by averaging out the statistically independent noise content of two or more received channels. Communication methods using such spatially separated antenna arrays are often referred to as "spatial diversity" methods.

The use of tripole antennas offers advantages similar to those offered by spatial diversity methods. Tripole antennas offer the further advantage that independent polarization channels can be provided without the need for significant spatial separation between antenna elements. In fact, transmissions along the respective polarization axes can effectively emanate from one and the same point. As a consequence, the benefits of diversity (which in this case is polarization diversity rather than spatial diversity) can be enjoyed even in compact communication terminals such as mobile handsets, where there may be insufficient space to install spatially extended arrays.

More specifically, it will often be both feasible and advantageous to use a tripole antenna or antenna arrangement 110 whose maximum dimension D is no more than one wavelength at the transmitted or received carrier frequency. That is, the entire antenna arrangement (not including cables 131–133) fits within a sphere of diameter D. Similarly, in the case of an antenna arrangement having multiple elements, it will be advantageous for the maximum distance from any element to any other element to be no more than one wavelength.

Receive Diversity and Transmit Diversity

Those skilled in the art will appreciate that antenna arrangements according to the invention are readily used with any of a broad range of analog and digital modulation schemes. It will also be appreciated that two ways, among others, to utilize multiple polarization channels are: (a) to increase redundancy in a transmitted signal corresponding to a single communication channel, leading to improved quality in the received signal; and (b) to increase the capacity of the propagation channel by sending independent signals corresponding to distinct communication channels. The first of these effects is sometimes referred to as "receive diversity," and the second is sometimes referred to as "transmit diversity."

Several co-pending patent applications, commonly assigned herewith, describe techniques for achieving diversity using spatially extended antenna arrays. These include application Ser. No. 08/673981, filed on Jul. 1, 1996 by G. J. Foschini, application Ser. No. 09/060,657, filed on Apr. 15, 1998 by G. J. Foschini et al., provisional application Ser. No. 60/141,504, filed on Jun. 28, 1999 by G. J. Foschini et al., and application Ser. No. 09/438,900, filed on Nov. 12, 1999 by B. Hassibi.

When a CDMA modulation scheme is used, receive diversity is advantageously achieved by applying the same signal successively to connections 121–123 of the transmission antenna. Each copy of the transmitted signal thus has a corresponding time delay (which may be regarded as zero if one of the three copies is taken as the reference signal). A RAKE receiver at the receiving location will interpret each of these time delays as corresponding to a distinct echo. The RAKE receiver will apply known techniques to compile the various received echoes, both actual and simulated, into a recovered signal having optimal, or near-optimal, noise characteristics.

RAKE receivers are described, e.g., in J. G. Proakis, *Digital Communications*, 3d Ed., WCB Division of McGraw-Hill, 1995, pp. 795–806.

There are other methods for deriving increased benefit from receive diversity that are applicable even when CDMA is not used. In this regard, it should be noted that the greatest diversity is achieved between signals that are statistically independent. Thus, when parallel channels contain substantially the same communication data, it is advantageous to process the respective base-band signals in such a way that they are effectively randomized, i.e., de-correlated, with respect to each other. Timing jitter, as in the CDMA scheme described above, provides one type of randomization. Another type of randomization is provided in the form of random codes. For example, when three parallel signals are to be transmitted, two of them are multiplied at baseband by respective sequences of random digits, such as random binary sequences. The random sequences are known by the receiver and used for recovery of the original signal. Generally, the same sequences can be reused repeatedly. Thus, it is not necessary to continually generate new random code.

It is important to note in this regard that a tripole receiving antenna will generally provide useful benefits of receive diversity even when transmission is from but a single transmitting antenna element.

Signal Processing Techniques

As noted above, there are known techniques, such as those using pilot signals, for measuring the coefficients of the channel matrix (or "propagation matrix") H. When a suitable estimate of these coefficients has been obtained, the propagation channel is said to be a "known" channel. When the channel is known, it will be advantageous in at least some cases to transmit a transformed version $\Omega s$ of the transmission signal vector s referred to above. The transformation $\Omega$ is readily chosen, according to known techniques, to simplify the process of signal recovery at the receiving location.

As stated in Equation (1), above, the received signal vector r is related to the transmitted signal vector s by the channel matrix: r=Hs. One useful technique is to compute a suitable inverse or pseudoinverse $\hat{H}^{-1}$ of the channel matrix at the transmitting location, using the results of channel measurements. Appropriate pseudoinverses are described, for example in technical literature in the field of maximum-likelihood decoding. Then, the inverse or pseudoinverse is used to transform the signal vector s to a new vector s' before modulating the signal vector onto the carrier and transmitting it. That is, $s'=\hat{H}^{-1}s$. The main advantage of this transformation is that it reduces the amount of processing required at the receiver.

An alternative transformation $\Omega$ is obtained by using known techniques to decompose the known channel matrix H into a product of 3×3 matrices of the form $H=USV^{554}$, wherein U is a unitary matrix, S is a diagonal matrix, and $V^{554}$ is a unitary matrix. Such a factorization is referred to as a singular value decomposition. Here, the transformed signal vector s' is given by s'=Vs. The main advantage of this transformation is that it provides three uncoupled, or nearly uncoupled, channels.

Optionally, the individual components of the vector s can be subjected to power compensation before the transformation V is applied, using, e.g. the procedure known in the art as "water filling." Briefly, the total channel capacity is increased by increasing the relative amount of power transmitted on the channels having higher signal-to-noise ratio. For this purpose, the singular values of the channel matrix, which are also the diagonal elements of the matrix S, provide an indication of the respective signal-to-noise ratios.

It should be noted that when a transformation $\Omega$ is used, as discussed above, the excitation signal applied to each signal connection 121, 122, 123 of the transmitting antenna represents a linear combination of the three original signals (whether parallel signals due to a single communication channel, or independent signals representing distinct communication channels) with complex weight coefficients.

The invention claimed is:

1. A method for communicating information in a wireless communication system, comprising the steps of:
    developing three communication signals; and
    applying each of the three communication signals to a different input of three input connections of an antenna arrangement with a first property that excitation thereof by an incident electromagnetic wave induces electric currents to appear at the three input connections that are representable as a complex vector to be referred to as the induced current vector; and a second property that three incident electromagnetic plane waves can be found, having mutually orthogonal polarizations, for which the respective induced current vectors collectively span a complex, three-dimensional vector space.

2. A method for communicating information in a wireless communication system, comprising applying a communication signal to each of at least a group of three input connections of an antenna arrangement, respectively, thereby to transmit the communication signals from the antenna arrangement, said antenna being one that induces a far-field radiation pattern with a property that for each point therein, a selected transverse polarization of the radiated electric field results from applying to the three input connections particular chosen signals for said communication signals.

3. The method of claim 1 or claim 2, wherein each of the three input connections is made to a distinct antenna element.

4. The method of claim 1 or claim 2, wherein each of the three input connections is made to a distinct dipole element.

5. A method for communicating information in a wireless communication system, comprising applying a communication signal to each of at least a group of three input connections of an antenna arrangement, respectively, where the antenna arrangement comprises three dipole elements, each dipole element is oriented at least 15° from each of the other two dipole elements, and is oriented at least 15° from the plane defined by the other two dipole elements, and each input connection is made to a distinct one of the dipole elements.

6. The method of claim 1, 2, or 5, wherein a communication signal containing substantially the same data is applied concurrently to each of the three input connections.

7. The method of claim 1, 2, or 5, wherein the communication signals are CDMA signals, and a communication signal containing substantially the same data is applied to each of the three input connections with a distinct, respective time delay.

8. The method of claim 1, 2, or 5, wherein an independent communication signal containing a distinct stream of data is transmitted concurrently from each antenna element of said group.

9. The method of claim 1, 2, or 5, wherein the communication signal to be applied to each of the three input connections is produced by providing a respective baseband signal and modulating the baseband signal onto a radio-frequency carrier.

10. The method of claim 9, wherein the respective baseband signals contain substantially the same data but are substantially decorrelated from each other.

11. The method of claim 10, wherein at least one of the baseband signals is decorrelated from the others by multiplying it by a random code.

12. The method of claim 9, wherein the respective baseband signals are generated by:
    providing three data signals; and
    forming each baseband signal as a linear combination of the data signals having a distinct set of weight coefficients.

13. The method of claim 12, further comprising:
    obtaining a set of estimated channel coefficients for signal propagation to a receiving location; and
    devising the weight coefficients in accordance with the set of estimated channel coefficients.

14. The method of claim 1, 2, or 5, wherein:
    there is a transmission wavelength for the communication signals; and
    the antenna arrangement has a maximum dimension that is no more than the transmission wavelength.

15. The method of claim 1, 2, or 5, wherein:
    there is a transmission wavelength for the communication signals;
    the antenna arrangement has multiple elements; and
    the maximum distance from any element to any other element is no more than the transmission wavelength.

16. A method of wireless communication, comprising demodulating a respective radio-frequency signal received from each of at least a group of three output connections of an antenna arrangement, thereby to obtain respective baseband signals, and processing said baseband signals, thereby to recover at least one communication signal, wherein:
    the antenna arrangement has the property that excitation thereof by an incident electromagnetic wave induces electric currents to appear at the three output connections, the amplitudes of said currents representable as a complex vector to be referred to as the induced current vector; and
    the antenna arrangement has the further property that three incident electromagnetic plane waves can be found, having mutually orthogonal polarizations, for which the respective induced current vectors collectively span a complex, three-dimensional vector space.

17. A method of wireless communication, comprising demodulating a respective radio-frequency signal received from each of at least a group of three output connections of an antenna arrangement, thereby to obtain respective baseband signals, and processing said baseband signals, thereby to recover at least one communication signal, wherein:

the antenna arrangement comprises three dipole elements;

each dipole element is oriented at least 15° from each of the other two dipole elements, and is oriented at least 15° from the plane defined by the other two dipole elements; and each output connection is made to a distinct one of the dipole elements.

18. The method of claim 16 or claim 17, wherein the processing of the baseband signals comprises forming a weighted sum of the baseband signals, and recovering data in one communication channel from said weighted sum.

19. The method of claim 16 or claim 17, wherein the radio-frequency signals are CDMA signals, and the processing of the baseband signals is carried out, in part, by using a RAKE detector to recover data in one communication channel from two or more redundant radio-frequency signals received at different time delays.

20. The method of claim 16 or claim 17, wherein the processing of the detected signals is carried out so as to recover data in two or more independent communication channels.

21. The method of claim 16 or claim 17, wherein:

the radio-frequency signals have a transmission wavelength; and the antenna arrangement has a maximum dimension that is no more than the transmission wavelength.

22. The method of claim 16 or claim 17, wherein:

the radio-frequency signals have a transmission wavelength;

the antenna arrangement has multiple elements; and the maximum distance from any element to any other element is no more than the transmission wavelength.

23. An antenna arrangement comprising:

three output connections; and a plurality of receiving elements coupled to said three output connections spatially arranged to impart to said antenna arrangement a first property that excitation thereof by an incident electromagnetic wave induces electric currents to appear at the three output connections that are representable as a complex vector, and a second property that three incident electromagnetic plane waves can be found, having mutually orthogonal polarizations, for which the respective induced current vectors at the three output connections collectively span a complex, three-dimensional vector space.

24. An antenna arrangement comprising:

three outputs; and one or more receiving elements coupled to said three outputs that are spatially arranged to form a tripole antenna.

25. An antenna arrangement comprising three outputs; and one or more receiving elements coupled to said three outputs that are spatially arranged to form output currents $i^{(1)}$, $i^{(2)}$, $i^{(3)}$, respectively that collectively span a complex three-dimensional vector space in response to three incident plane waves applied to said one or more receiving elements, which waves have mutually orthogonal polarizations.

26. An antenna arrangement comprising three outputs; and one or more receiving elements coupled to said three outputs that are spatially arranged to form output currents $$J = [i^{(1)} i^{(2)} i^{(3)}] = \begin{bmatrix} i_1^{(1)} & i_1^{(2)} & i_1^{(3)} \\ i_2^{(1)} & i_2^{(2)} & i_2^{(3)} \\ i_3^{(1)} & i_3^{(2)} & i_3^{(3)} \end{bmatrix}$$

in response to three incident plane waves applied to said one or more receiving elements, which waves have mutually orthogonal polarizations, and J is a full-rank matrix.

27. The antenna arrangement of claim 26 where ratio of element $i_j^{(k)}$ in the J matrix having the largest value to element $i_m^{(n)}$ in the J matrix having the smallest value is not more than fifty.

* * * * *